US009682806B2

(12) United States Patent
Zantout et al.

(10) Patent No.: US 9,682,806 B2
(45) Date of Patent: Jun. 20, 2017

(54) CABLE LACING TIE DEVICES AND METHODS OF USING THE SAME

(71) Applicant: IDEAL INDUSTRIES, INC., Sycamore, IL (US)

(72) Inventors: Alan E. Zantout, Sycamore, IL (US); Robert W. Sutter, Dekalb, IL (US); Michael Weiby, Bartlett, IL (US); James Davidson, St. Charles, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 0 days.

(21) Appl. No.: 14/527,214

(22) Filed: Oct. 29, 2014

(65) Prior Publication Data

US 2015/0266636 A1 Sep. 24, 2015

Related U.S. Application Data

(63) Continuation of application No. 14/223,685, filed on Mar. 24, 2014, now abandoned.

(51) Int. Cl.
| *B65D 63/10* | (2006.01) |
| *B65D 63/00* | (2006.01) |
| *F16L 3/22* | (2006.01) |
| *F16L 3/23* | (2006.01) |
| *H02G 3/32* | (2006.01) |

(52) U.S. Cl.
CPC ......... *B65D 63/1018* (2013.01); *B65D 63/00* (2013.01); *B65D 63/10* (2013.01); *F16L 3/22* (2013.01); *F16L 3/23* (2013.01); *H02G 3/32* (2013.01); *Y10T 24/14* (2015.01); *Y10T 24/142* (2015.01); *Y10T 24/1414* (2015.01); *Y10T 29/49826* (2015.01)

(58) Field of Classification Search
CPC ......... A44B 11/10; A44B 11/14; A44B 11/06; B65D 63/00; B65D 63/10; B65D 63/1018; F16L 3/22; F16L 3/23; H02G 3/32; Y10T 24/14; Y10T 24/1406; Y10T 24/141; Y10T 24/1414; Y10T 24/1418; Y10T 24/1498; Y10T 24/3971
USPC .......... 24/268, 16 PB, 17 A, 17 AP, 134 KA, 24/136 K, 490, 491, 170
See application file for complete search history.

(56) References Cited

U.S. PATENT DOCUMENTS

| 134,052 A | 12/1872 | Gurley |
| 1,044,249 A | 11/1912 | Ronfet |
| 3,186,047 A | 6/1965 | Schwester et al. |

(Continued)

OTHER PUBLICATIONS

ISA/US, International Search Report and Written Opinion issued on PCT Application No. US15/18921, dated Jun. 12, 2015, 8 pages.

*Primary Examiner* — Abigail Morrell
(74) *Attorney, Agent, or Firm* — Greenberg Traurig, LLP

(57) ABSTRACT

A cable lacing tie device includes a head assembly and a cable lacing tape. The head assembly being configured to retain a first portion of the cable lacing tape within the head assembly and having a length of the cable lacing tape extending from the head assembly. The head assembly further adapted to retain a second portion of the cable lacing tape extending from the head assembly. The methods of using the cable lacing tie devices include retaining a first portion of a cable lacing tape in a head assembly, looping the cable lacing tape around a plurality of objects, and retaining a second portion of the cable lacing tape within the head assembly.

13 Claims, 9 Drawing Sheets

(56) References Cited

U.S. PATENT DOCUMENTS

| | | |
|---|---|---|
| 3,416,198 A | 12/1968 | Geisinger |
| 3,488,813 A | 1/1970 | Kohke |
| 3,660,869 A | 5/1972 | Caveney et al. |
| 3,739,429 A | 6/1973 | Kohke |
| 3,744,104 A | 7/1973 | Ford |
| 3,766,610 A | 10/1973 | Thorsbakken |
| 3,800,450 A | 4/1974 | Laugherty et al. |
| 3,875,618 A | 4/1975 | Schuplin |
| 3,875,771 A | 4/1975 | Reisner |
| 3,886,630 A | 6/1975 | Emery |
| 3,900,922 A | 8/1975 | McCormick |
| 3,909,884 A | 10/1975 | Weckesser |
| 4,008,512 A | 2/1977 | Prodel |
| 4,038,726 A | 8/1977 | Takabayashi |
| 4,366,602 A | 1/1983 | Conlon et al. |
| 4,422,217 A | 12/1983 | Barrette |
| 4,498,507 A | 2/1985 | Thompson |
| 4,514,882 A | 5/1985 | Lavielle |
| 4,680,834 A | 7/1987 | Andre et al. |
| 4,761,861 A | 8/1988 | Peles |
| 4,765,032 A | 8/1988 | Fortsch |
| 4,854,015 A | 8/1989 | Shaull |
| 4,932,104 A | 6/1990 | Kowal |
| 4,993,669 A | 2/1991 | Dyer |
| 5,102,075 A | 4/1992 | Dyer |
| 5,121,524 A | 6/1992 | Mortensen |
| 5,193,251 A | 3/1993 | Fortsch |
| 5,336,846 A * | 8/1994 | Sachs ................ H02G 7/056 174/40 CC |
| 5,356,417 A | 10/1994 | Golds |
| 5,544,391 A | 8/1996 | Hoffman |
| 5,566,427 A | 10/1996 | Lathrop |
| 5,577,395 A | 11/1996 | Kuykendall |
| 5,669,253 A | 9/1997 | Higgins |
| 5,802,888 A | 9/1998 | Parsons |
| 5,979,095 A | 11/1999 | Schneider et al. |
| 6,044,669 A | 4/2000 | Levi |
| 6,076,234 A | 6/2000 | Khokhar et al. |
| 6,128,809 A | 10/2000 | Khokhar |
| 6,148,486 A * | 11/2000 | Uehara ................ A44B 11/10 24/170 |
| 6,199,412 B1 | 3/2001 | Kennedy |
| 6,230,369 B1 | 5/2001 | Steadman |
| 6,510,717 B1 | 1/2003 | Levi |
| 6,532,631 B2 | 3/2003 | Rohaly et al. |
| 6,648,378 B1 | 11/2003 | Torres et al. |
| 6,684,462 B1 | 2/2004 | Narula et al. |
| 6,763,553 B2 | 7/2004 | Hatch |
| 6,863,855 B2 | 3/2005 | Shilale |
| 6,928,701 B2 | 8/2005 | Hutter, III |
| 7,013,535 B2 | 3/2006 | Tracy |
| 7,328,487 B2 | 2/2008 | Hoffman et al. |
| 7,406,789 B2 | 8/2008 | Story |
| 7,644,475 B2 | 1/2010 | Canady |
| 7,832,693 B2 | 11/2010 | Moerke et al. |
| 8,307,517 B2 | 11/2012 | Piermayr et al. |
| 2002/0170151 A1 | 11/2002 | Caveney et al. |
| 2003/0110596 A1 | 6/2003 | Graham et al. |
| 2005/0091801 A1 | 5/2005 | Feschuk |
| 2010/0306967 A1 | 12/2010 | Geiger |
| 2012/0084948 A1 | 4/2012 | Breen, IV et al. |

* cited by examiner

CABLE LACING TIE DEVICES AND METHODS OF USING THE SAME

CROSS REFERENCE TO RELATED APPLICATION

This application is a continuation of U.S. patent application Ser. No. 14/223,685 filed Mar. 24, 2014, entitled "Cable Lacing Tie Devices and Methods of Using the Same" and incorporated herein by reference in its entirety.

FIELD OF THE DISCLOSURE

The present description relates generally to devices and methods for holding objects together and more particularly to cable lacing tie devices and methods of using the same.

BACKGROUND OF RELATED ART

Individual wires, wire harnesses, or cables having two or more wires or strands are customarily grouped and held adjacent to each other at various points along their lengths by use of cable ties or cable lacing tape. For example, it may be desirable to hold together two or more wires, wire harnesses, cables or other objects, or connect such objects to other structures. In these instances, cable lacing tie assemblies may be used to help ensure the safety and durability of the various components.

Cable ties have become very common and typically are formed from a molded piece of plastic that includes an elongated solid strap connected at one end to a buckle. The strap is intended to be looped around a bundle of wires and then fed into the buckle. In an example, corresponding surfaces on the strap and within the buckle commonly have complementary serrated patterns that can achieve a locking position. Thus, a cable tie buckle often includes a molded locking element or pawl within the passageway to cooperate with molded serrations or teeth along the strap. The buckle may include a separately provided metal pawl to engage the serrations on the strap. Alternatively, the strap may have flat surfaces and the buckle may include a separately provided metal barb or knife-like strap piercing element to cut or bite into the strap and prevent rearward withdrawal of the strap. However, such a barb or knife like strap piercing element is usually destructive to the strap when it cuts or bites into the strap, permanently reducing the strength of the strap and increasing the tendency for the strap to tear through.

Once a strap of a cable tie is passed into the buckle, it may be cut to remove any remaining free end. However, in these instances, the cut section of the molded plastic strap that protrudes from the buckle can present an undesirable, fairly sharp obstruction that may result in abrasion problems with respect to adjacent wire bundles, and may be problematic if one is attempting to pull the wire bundle through an aperture, such as a panel opening. This also can be true of the molded buckle itself, which can be relatively large and may have fairly sharp edges. It should be noted that another drawback of molded plastic cable ties is that, due to their relative rigidity, they generally are not capable of closely hugging irregular or rectangular shapes, as may occur when bundling wires, wire harnesses or cables, or connecting them to other structures.

In use, a cable tie can be subjected to elevated temperatures, such as for instance in the aerospace environment, which may reach as high as 400° F. These elevated temperatures can cause a common cable tie, which is typically molded from thermoplastic material, such as nylon, to creep or lose structural integrity. In addition, the integral locking element or pawl that engages the strap then may yield, allowing the wire bundle to separate or come loose. The locking element or pawl generally will be constructed to be deflectable, so as to reduce the strap insertion force, but this also compromises the ability to retain the strap, especially at high temperatures. Cable ties that have a separately provided metal locking element or pawl usually are intended to provide for increased retention, even at elevated temperatures, but these structures typically require higher insertion forces when passing over the metal element.

Because of many of the above drawbacks associated with plastic molded cable ties, in areas where elevated levels of safety are required, such as in the military and commercial aircraft industries, the aerospace industry, as well as in some marine environments, there is a preference to use a procedure known as "cable lacing" for securing or bundling wires, wiring harnesses or cables. Cable lacing includes looping a material commonly referred to as "cable lacing tape" around wires, wire harnesses or cables and tying knots in the cable lacing tape, either in discrete locations along the length of the bundle, referred to as spot ties, or in a running format with the cable lacing tape continuing along the bundle between knot locations.

Modern cable lacing tapes typically are a thin, relatively flat, woven, or braided cord, often referred to as a "tape," having filaments that may be made of materials such as nylon, polyester or aramid fiber, and which may be impregnated with coatings to enhance particular performance characteristics. Materials such as aramid fiber provide good tensile strength, while being non-flammable, highly resistant to fluids and lubricants, and able to perform in extreme temperature environments, such as from approximately −65° F. to 500° F. However, cable lacing has drawbacks in that the cable lacing tape typically is tied by hand in a costly, labor-intensive, and time-consuming process. Due to these problems, several attempts have been made to automate the cable lacing process.

One such device for automated knot tying is described in U.S. Pat. No. 6,648,378, which generally describes a hand-held housing and a knot-tying mechanism within that housing comprising a plurality of carriage rings, for wrapping the filament around the workpiece. A shuttle moves the filament between the carriage rings and along the workpiece, and a plurality of hooks pull the filament away from the workpiece. The operation is finished by cinching, cutting, and reloading so that the resulting knot is discrete and secure.

Another automated device is disclosed in U.S. Pat. No. 8,622,440, which is directed to a knot tying device for tying a filament in a knot around an article and a filament delivery device from which is drawn the filament. The filament delivery device may be in the form of a cartridge having a housing sized and arranged to be releasably attached to the knot tying device where the housing has an opening through which pre-cut or loosely coupled lengths of the filament can be drawn. The knot tying device includes a shuttle attachable to the filament where the shuttle is caused to be moved during a knot tying process around an article to be tied and a device for at least pulling the filament away from the article at appropriate times during the knot tying process.

DETAILED DESCRIPTION

Figure 1A:
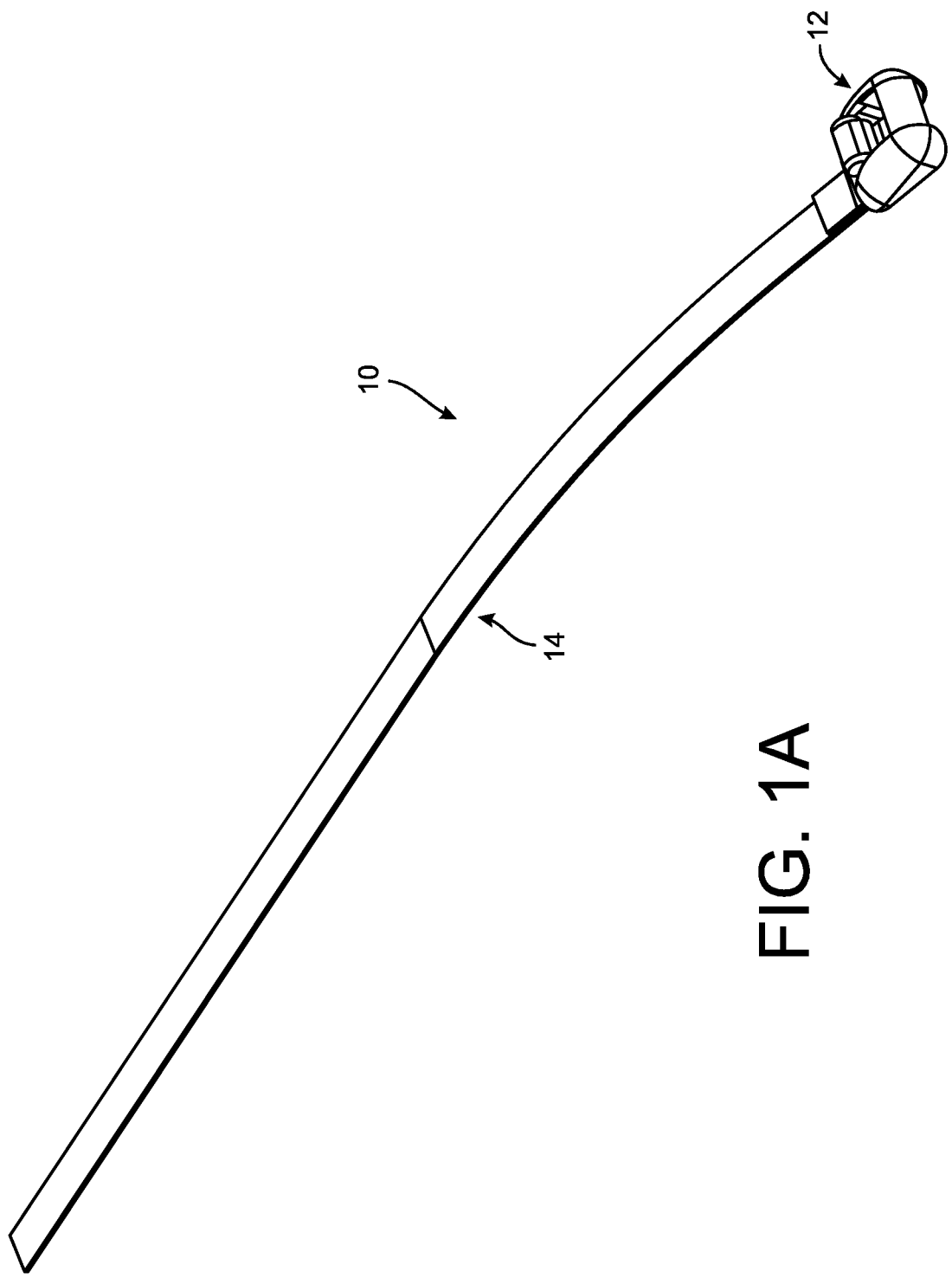
FIG. 1A is a perspective view of an example cable lacing tie device including a head assembly and a length of cable lacing tape.
Figure 1B:
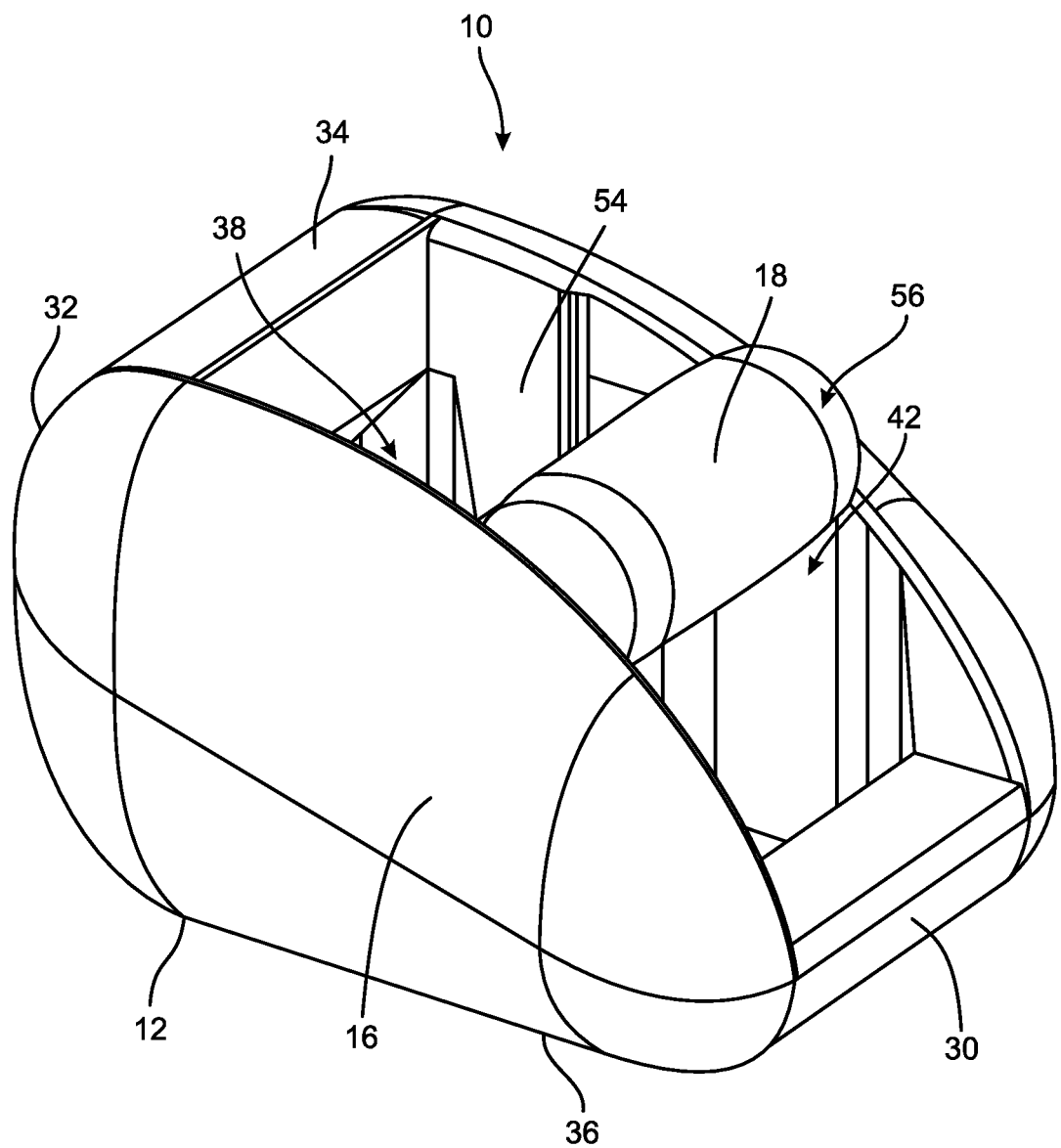
FIG. 1B is an enlarged, perspective view of the example head assembly illustrated of the example cable lacing tie device of FIG. 1A.

The following description of example methods and apparatus is not intended to limit the scope of the description to the precise form or forms detailed herein. Instead the following description is intended to be illustrative so that others may follow its teachings.

The present disclosure provides cable lacing tie devices for holding together a plurality of objects, such as objects of similar or different sizes that are to be gathered and held together at one or more predetermined locations, such as points along a group of wires, wiring harnesses, or cables that are gathered together to form a bundle. The disclosed cable lacing tie devices generally comprise a head assembly and a length of cable lacing tape, such as for instance a braided filament element. A first portion, such as a first end of the length of cable lacing tape, may be retained by the head assembly. In one example, the cable lacing tape is routed through, or otherwise connected to or molded within a body of the head. For instance, in the example illustrated, the cable lacing tape is routed through an opening in the head and sewn or otherwise adhered to itself to secure the head to the tape. In still other examples, both ends of the cable lacing tape may be secured within the assembly head as described hereinbelow.

In the present example, the body of the head assembly is molded from a non-conductive material that is adapted for use in a relatively high temperature environment, such as for instance a high-temperature plastic, although other materials may be used in correspondence with their desired performance characteristics. The head assembly also may include a retainer for retaining a second portion of the cable lacing tape within the head assembly. The first portion of the cable lacing tape alternatively could be retained within a retainer of a head assembly.

In one example, the retainer may have a first end having smooth sides and rounded geometry to allow the second portion of the cable lacing tape to slide easily and with minimal friction around the retainer prior to activation. The retainer may also have a second end with non-symmetric geometry so that the second portion of the cable lacing tape is forced to slide around sharp, complex geometry, thus increasing friction on the second portion of the cable lacing tape and discouraging relative movement, during and after activation. Still further, in some examples, the retainer is not intended to be a destructive element, and therefore, the device is not intended to pierce, cut, or otherwise damage the cable lacing tape itself. It will be appreciated by one of ordinary skill in the art, however, that in other examples, the retainer may permanently or temporarily deform the cable lacing tape as desired.

In the present example the disclosure also provides a cable lacing tie device that includes a head assembly and a cable lacing tape, the cable lacing tape including braided or woven filaments, a first portion of the cable lacing tape retained within the head assembly, the head assembly including a body having a passageway therethrough, a retainer being movable from an inactivated position to an activated position, and a second portion of the cable lacing tape having an end and the end being routed through the passageway in the head assembly in a path wherein the retainer is moved from the inactivated position to the activated position when the end of the second portion of the cable lacing tape is pulled.

In a further aspect, the disclosure provides a method of holding together a plurality of objects with a cable lacing tie device, wherein the cable lacing tie device comprises a head assembly having a passageway therethrough, a cable lacing tape and a retainer, the cable lacing tape comprising braided or woven filaments and being configured to have a first portion retained by the head assembly and a second portion having an end, the retainer being movable from an inactivated to an activated position to retain the second portion of the cable lacing tape within the head assembly. The method includes the steps of locating the head assembly at or near the plurality of objects, moving the second portion of the cable lacing tape to a position looped around the plurality of objects, routing the end of the second portion through the passageway in the head assembly while the retainer is in the inactivated position and in a path by which pulling the end of the second portion of the cable lacing tape will remove slack in the second portion of the cable lacing tape and will move the retainer from an inactivated position to an activated position, wherein the second portion of the cable lacing tape is retained within the head assembly.

At least one advantage of the cable lacing tie device of the present disclosure is that it may include head assemblies and cable lacing tapes that are constructed from one or more materials that are adapted for use in environments that involve relatively high temperatures or other extreme conditions. A weight savings also may be realized over plastic cable ties by using a light weight cable lacing tape that is of braided filament construction. The head assemblies further may be configured to provide near zero insertion force, thus permitting relatively easy insertion of the distal end of the cable lacing tape through the head assembly. The cable lacing tie devices also may be utilized in a method of cable lacing that provides very rapid and secure installation.

In still other instances, the cable lacing tie devices of the present disclosure may also provide advantages with respect to ease of use, such as having all of the components connected together for convenient handling, and avoidance of loose parts. In addition in at least one example, the cable lacing tie devices disclosed herein may be configured to permit the device to be used in cinching together a plurality of objects, eliminating slack in the cable lacing and then allowing a retainer to move into a position that retains the cable lacing tape within a head assembly, without the user having to do anything other than pull on a free end of the cable lacing tape. The movement effectively is automatic in that the user need not take any action other than to continue to pull on the end of the cable lacing tape until the force on the components that lock the cable lacing tape in its activated or installed position release from an inactivated position and move to an activated position.

While discussed with respect to examples that may be used in various industries, such as for example wire cable harness assembly, it will be appreciated that the disclosed cable lacing tie devices and methods of using the same may be utilized in other industries or applications, and may be incorporated into other systems, such as for example other electrical or communication systems, or for use with any objects requiring connection or bundling. Accordingly, while the present disclosure shows and demonstrates various example components, the examples are merely illustrative and are not to be considered limiting. It will be apparent to those of ordinary skill in the art that various cable lacing tie devices can be constructed without departing from the scope or spirit of the present disclosure.

Figure 2:
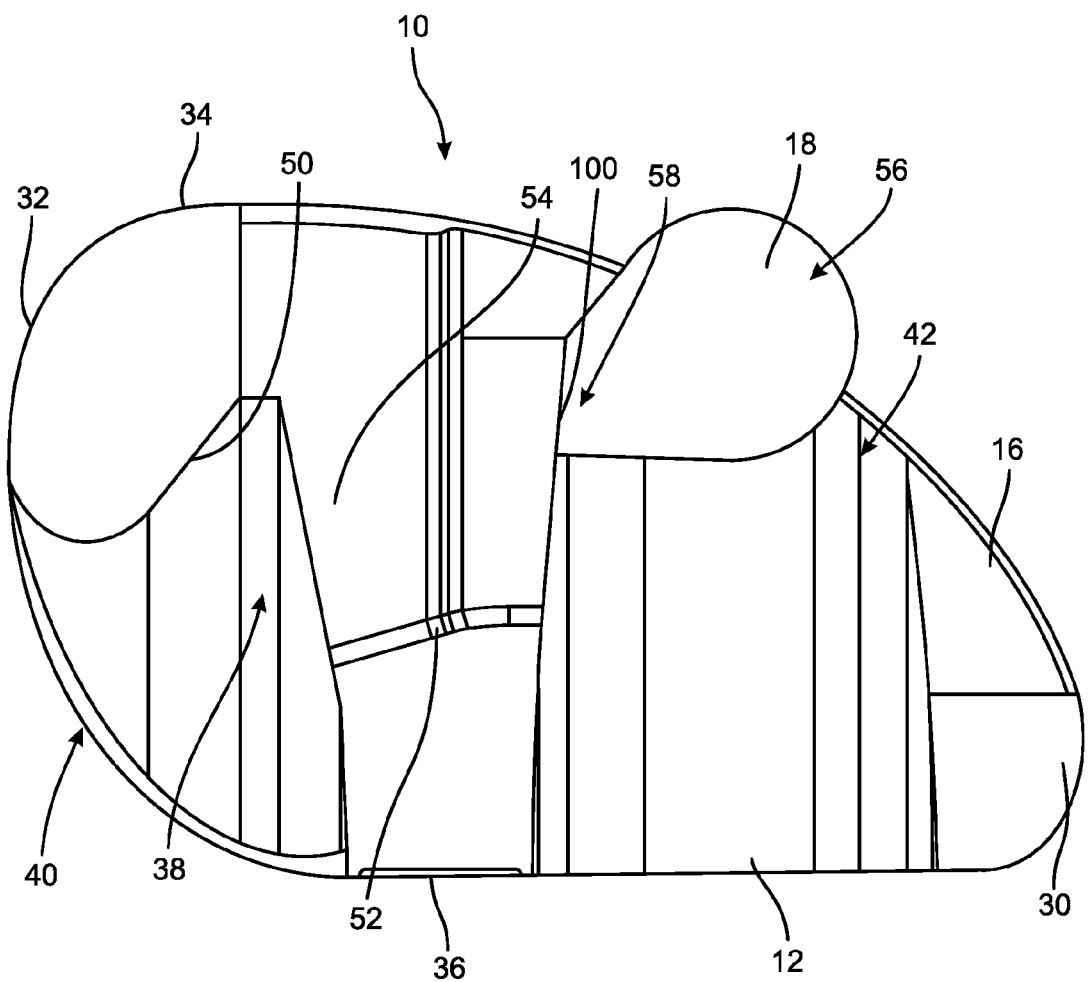
FIG. 2 is a cross-section view of the example head assembly taken along line 2-2 of FIG. 1.
Figure 3:
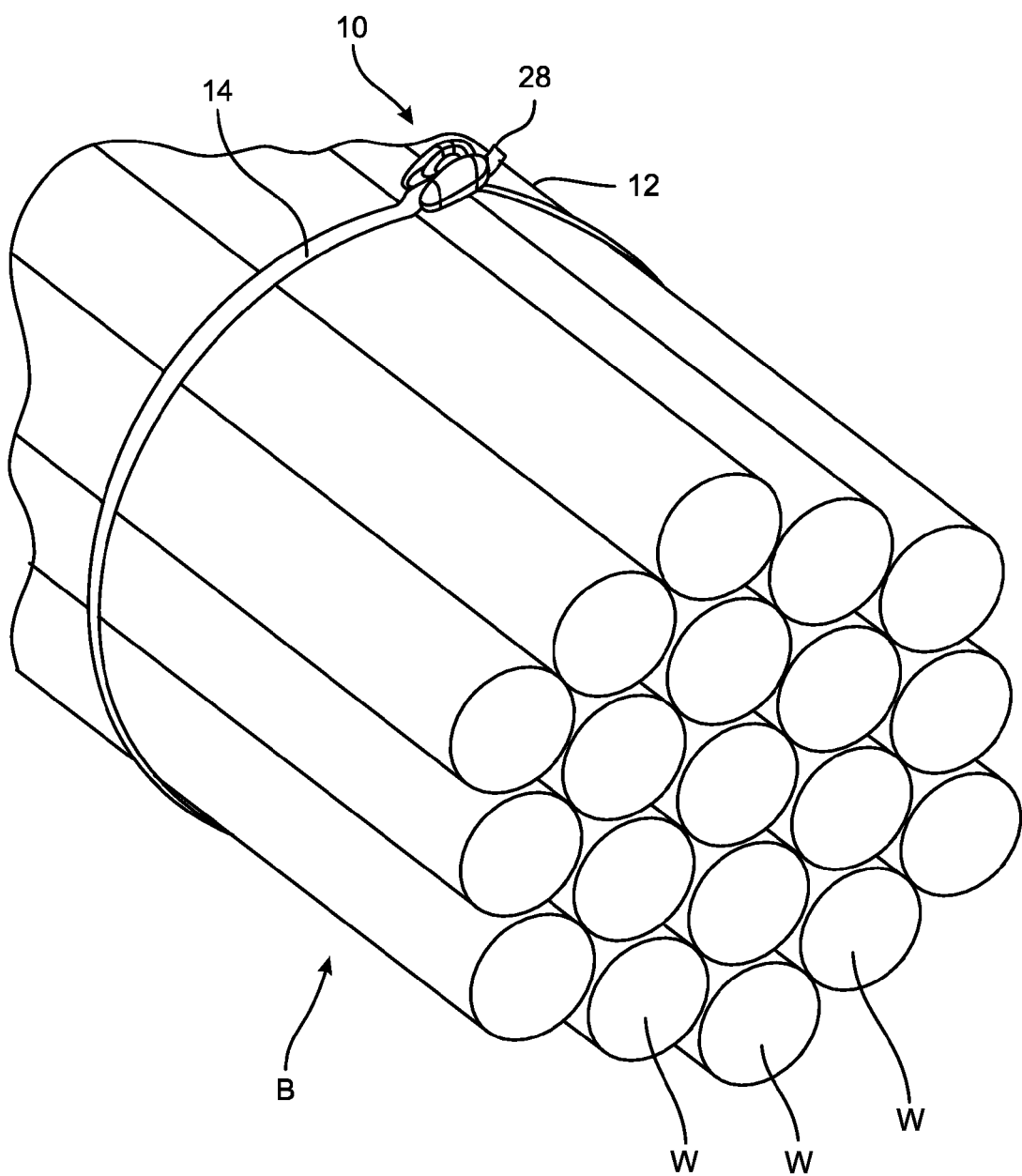
FIG. 3 is a perspective view of the example cable lacing tie device of FIG. 1 having been installed on an example bundle of wires.
Figure 4:
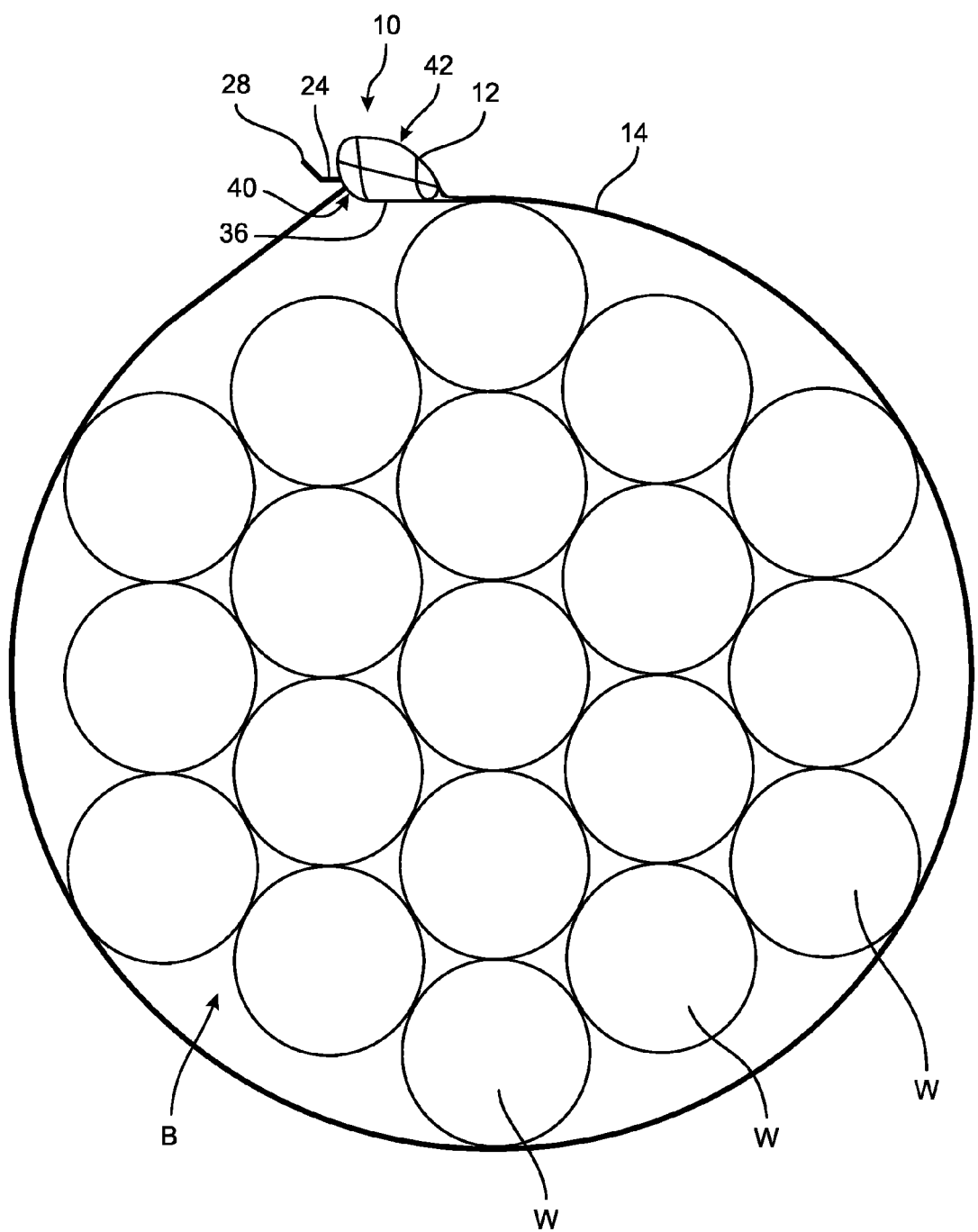
FIG. 4 is a side view of the example installed cable lacing tie device of FIG. 3.

Referring now to the drawings, an example cable lacing tie device 10 of the present disclosure is illustrated in FIGS. 1A, 1B, and 2-8. The example cable lacing tie device 10 includes a head assembly 12 and a length of cable lacing tape 14. The head assembly 12 of this example includes a molded body 16 and an actuatable retainer 18. In the illustrated example, a first portion 22 of the cable lacing tape 14 is configured to be retained in a first position within the head assembly 12 by sewing, adherence, and/or by other methods of connection as discussed below. As illustrated, the first portion 22 of the cable lacing tape 14 is disposed outside of a bottom surface of the head assembly 12, such that when installed, the first portion 22 of the cable lacing tape 14 makes contact with the product being bundled (see FIG. 3) thus minimizing the contact of the head assembly 12 to the bundled object, which may prevent potential damage to the bundled object by the head assembly 12. A length of the cable lacing tape 14 then extends from the rear of the head assembly 12. The cable lacing tie device 10 may be used, for example, to hold together a plurality of objects, such as to form a bundle B of a group of wires W, which are shown in FIGS. 3 and 4 in a simplified manner.

In the present disclosure, the body 16 and the retainer 18 may be injection molded and constructed of any suitable material. In at least one instance the example body 16 and retainer 18 are integrally formed as one component, thereby facilitating the ease of installation for the user because the user does not need to provide an additional assembly step of inserting the retainer 18 into the body 16 when installing the device 10. Still further, by varying the size and/or material of the connection between the retainer 18 and the body 16, one of ordinary skill in the art can optimize the force of actuation necessary to move the retainer 18 relative to the body 16 and to thereby activate the device 10. In one example, the body 16 and the retainer 18 may be formed of a non-conductive, high temperature plastic, although other plastics, polymers, and/or other conductive or non-conductive materials may be suitable for other environments. Accordingly, it will be appreciated that the retainer 18 may also be formed from any substance including a metal, such as spring steel, or any other suitable material including any alloy, molded composite, dual materials such as for instance an insert molded metal part in plastic, etc.

The example cable lacing tape 14 is constructed of a thin, relatively flat, braided filament element, such as that known as braided cable lacing tape, which can be made of one or more materials suitable for the intended use. This may include materials such as nylon, polyester, or natural fibers. In applications that require a more stable material, the example cable lacing tape may include aramid fiber, or other suitable modern filaments. Generally, when the cable lacing tape is depicted in the figures, for convenience, it is provided in a very simplified view in which it is represented as a thin, flat band. However, it will be understood that in all of the examples, the cable lacing tape may be any suitable type of tape, including a woven or braided filament construction.

Figure 5:
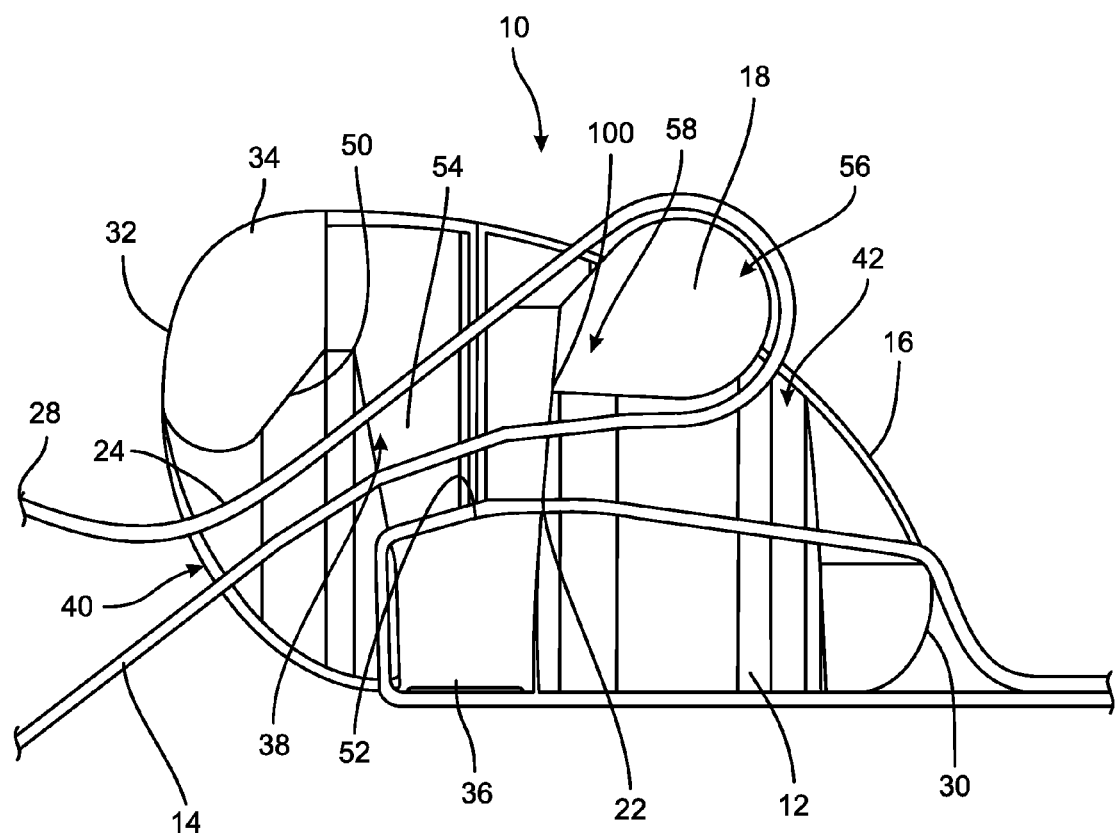
FIG. 5 is a cross-sectional view of the example head assembly similar to FIG. 2 showing a retainer of the head assembly in an inactivated, ready position with the cable lacing tape threaded through the head assembly.

Referring in particular to FIG. 5, the first portion 22, such as a first end of the cable lacing tape 14 is semi-permanently retained in the head assembly 12. For instance, the cable lacing tape 14 may be looped through the head assembly 12 and adhered to itself though any suitable means. In this fashion, the head assembly 12 is designed with the same entrance and exit location for ease of installation. In particular, by locating the entrance and exit on the same side of the head assembly, the installer may work all from one direction. As will be appreciated by one of ordinary skill in the art, other permanent, semi-permanent, or temporary retention means may be utilized as desired. For example, in one example, both ends of the cable lacing tape may be fed through the head assembly 12 and retained in the activated position (see FIG. 9). The cable lacing tape 14 may also include a tip (not shown) molded to the distal or second end 28 of the cable lacing tape 14 that extends from the head assembly 12. The tip (not shown) may help protect the tape 14, or as discussed in further detail below, facilitate insertion of the second end 28 of the cable lacing tape 14 through the head assembly 12.

Figure 6:
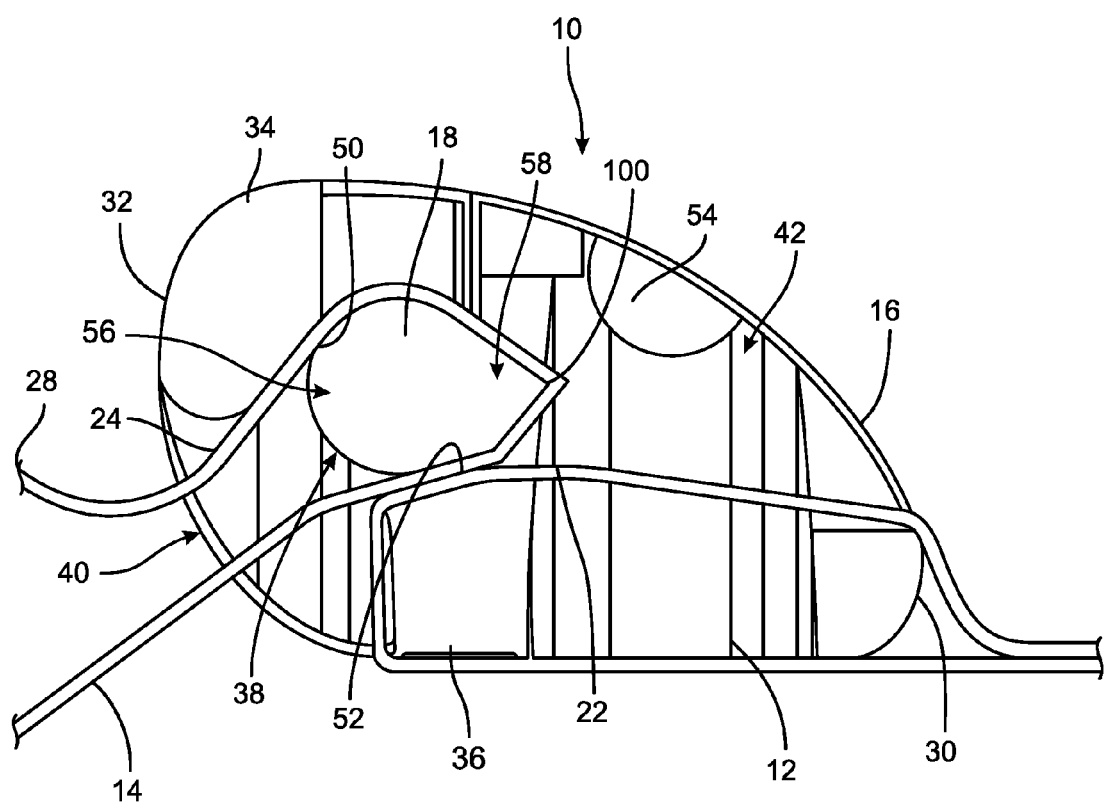
FIG. 6 is a cross-sectional view of the example head assembly of FIG. 5 showing the retainer in an example activated position.

As shown in FIGS. 2, 5 and 6, the body 16 of the example head assembly 12 generally has a rear surface 30, a front surface 32, a top surface 34, a bottom surface 36 and a passageway 38 having a first opening 40 between the front surface 32 and the bottom surface 36 for entering and exiting the passageway 38. A second opening 42 is located between the rear surface 30 and the top surface 34 for looping the cable lacing tape 14 around the retainer 18 and back through the passageway 38.

A second portion 24 of the cable lacing tape 14 extends outward from the front surface 32 of the head assembly 12, opposite the direction in which the retainer 18 extends from the head assembly 12 when in the inactivated position. Thus, the retainer 18 is held in a position extending rearward through the looping opening 42 in the rear surface 30. Furthermore, in the illustrated inactivated position of FIG. 2, the retainer 18 is raised above the head assembly 12 (e.g., extends outside the perimeter surface of the head assembly) to give a visual indicator to a user that the device 10 has or has not been activated.

One having ordinary skill in the art will appreciate that there are many ways to hold the retainer in the inactivated position. For example, the retainer may be held in place with plastic arms located with respect to any of the corresponding outer surfaces of the retainer or inner surfaces of the passageway through the body that are opposed to each other, and may be integrally formed, such as for example by molding, with the body and retainer. In another example, the retainer may be held in place with serrated and/or otherwise break-away components located with respect to any of the corresponding outer surfaces of the retainer or inner surfaces of the passageway through the body that are opposed to each other, and may be integrally formed with the body and retainer. In still yet another example, the retainer may be formed separately from the body, and may be held in place with a frictional fit between the inner surfaces of the passageway through the body that are opposed to each other. In still other examples, the retainer may be provided with tabs and/or other protrusions that may be locatable in a detent, channel, and/or other depression in the body itself.

In the illustrated example, the passageway 38 is generally tapered or funnel-shaped with an upper wall 50, a lower wall 52, and side walls 54. The retainer 18 has a first end 56 with generally smooth and rounded geometry, and a second end 58 with retaining geometry 100. In one example, the second end 58 includes an angular geometry, such as for example a protrusion and/or point. It will be appreciated by one of ordinary skill in the art that the retaining geometry may vary as desired, provided the retainer 18 is capable of retaining the tape within the head assembly 12. In this example, the first end 56 of the retainer 18 is configured to lodge between the upper and lower walls 50, 52 of the passageway 38 when the retainer 18 is in the activated position.

Still referring to FIGS. 3-6, when desiring to use the cable lacing tie device 10 to hold together a plurality of objects, the head assembly 12 is moved to a position at or near a plurality of objects, such as a group of wires W to form a bundle B, located along the bottom surface 36 of the head assembly 12. The end 28 of the second portion 24 of the cable lacing tape 14 is moved to be looped around the plurality of objects and passed through the first opening 40 in the head assembly 12, and then between the lower wall 52 of the passageway 38 and the second end 58 of the retainer 18, so as to extend rearward from the second opening 42. The end 28 of the second portion 24 of the cable lacing tape 14 then is routed over the first end 56 of the retainer 18 and passed back through the second opening 42 and under the upper wall 50 of the passageway 38. The end 28 then extends forward through the first opening 40 where it can be grasped and pulled by the user.

When the end 28 of the cable lacing tape 14 is pulled, any slack is taken up as the second portion 24 of the cable lacing tape 14 moves through the head assembly 12 and around the retainer 18. The smooth and rounded geometry of the first end 56 of the retainer 18 allows the cable lacing tape 14 to slide easily and with minimal friction. As the slack is taken up, a further more proximal length of the cable lacing tape 14 continues to pass through the passageway 38 and eventually the tension in the cable lacing tape 14 tends to pull the cable lacing tape 14 toward the center of the plurality of objects to be held together, and therefore, into more forceful engagement with the first end 56 of the retainer 18. Eventually, the force placed on the retainer 18 causes the retainer 18 to translate towards the passageway 38 until the first end 56 of the retainer 18 lodges between the upper and lower walls 50, 52 of the passageway 38. In this manner, the example cable lacing tie device 10 is self-activating because the device 10 secures at the proper cable bundle tension as soon as the cable lacing tape 14 is pulled with sufficient force to activate the retainer 18.

One having ordinary skill in the art will appreciate that the force needed to translate and/or rotate the retainer 18 from the inactivated position will depend on the method used to retain the retainer 18 in the inactivated position. For instance, if the retainer 18 is connected to the body 16 with plastic arms, the force must exceed the strength of the plastic arms in order to shear the arms and allow relative movement. In another example, if the retainer 18 is held in the inactivated position with a frictional fit, the force needed to translate the retainer 18 must exceed the frictional force between the retainer 18 and the body 16.

Figure 7:
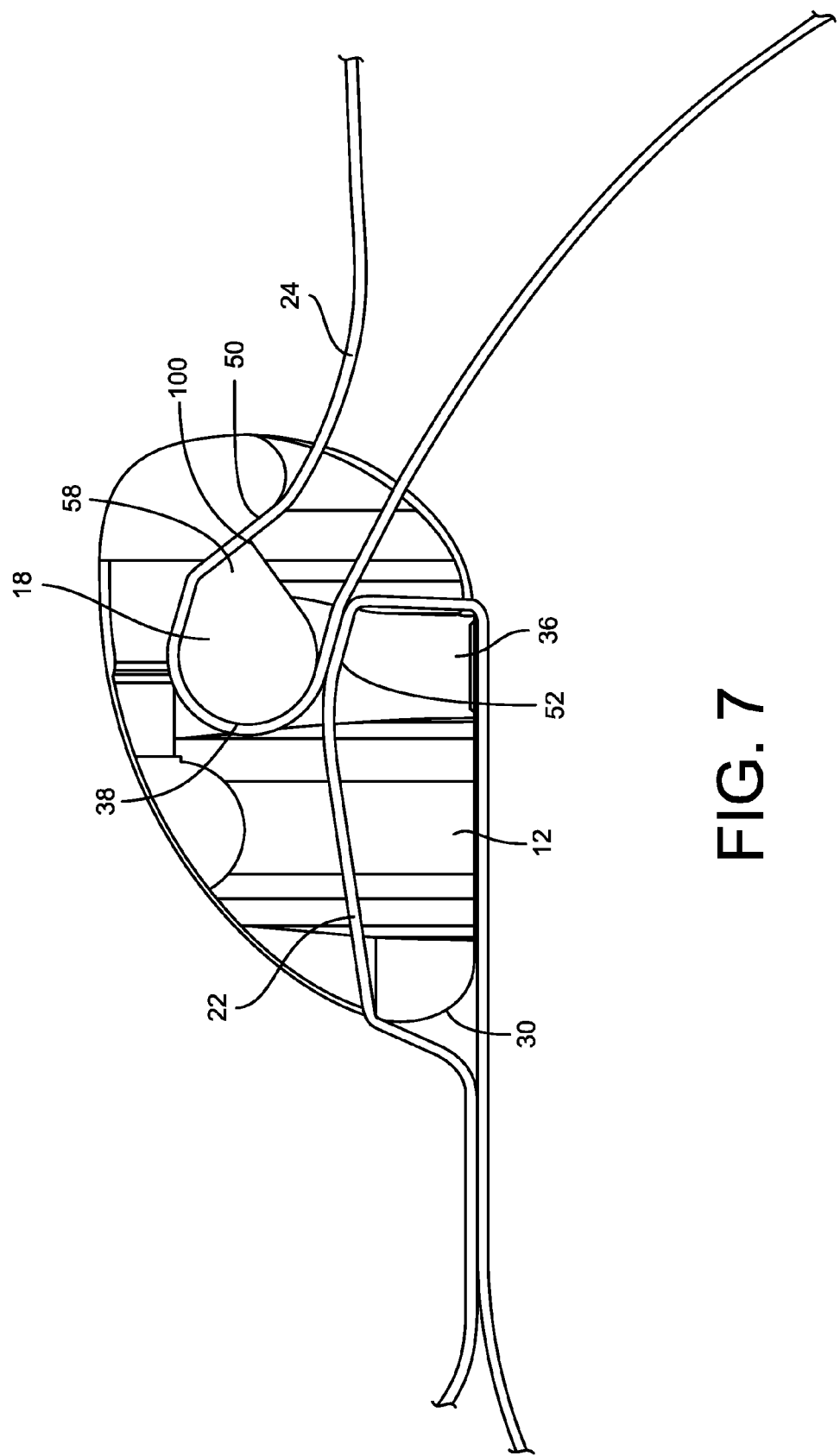
FIG. 7 is a cross-sectional view of the example head assembly of FIG. 5 showing the retainer in an example activated position.
Figure 8:
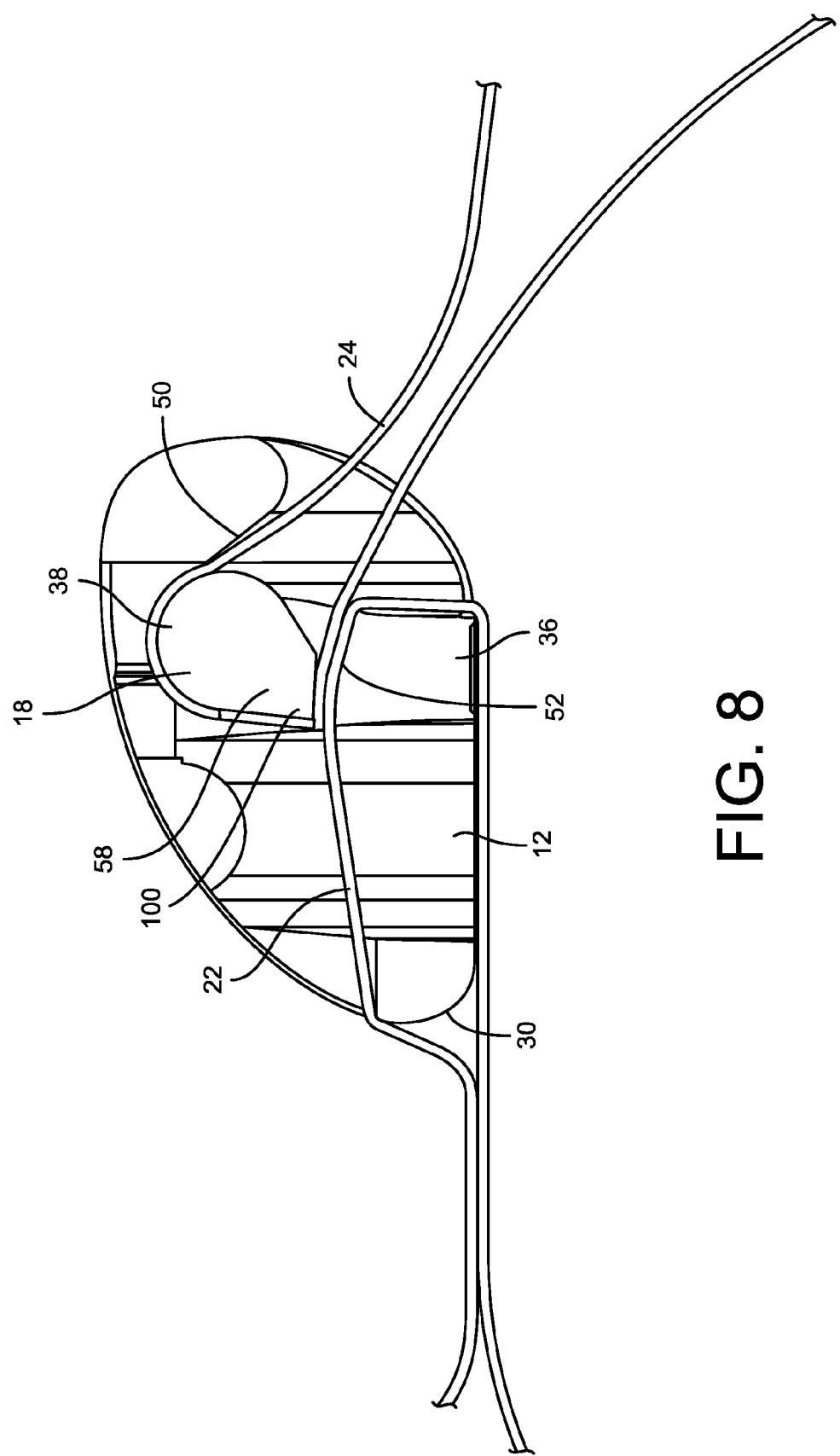
FIG. 8 is a cross-sectional view of the example head assembly of FIG. 5 showing the retainer in an example activated position.

Furthermore, the force placed on the retainer 18 causes the retainer 18 to rotate about its longitudinal axis so that the second end 58 of the retainer 18 faces generally outwards towards the second opening 42 generally contacting the first portion of the lace 22. In this way, the cable lacing tie device 10 is configured for a method of use where tightening the cable lacing tape 14 drives the retainer 18 from an inactivated, ready, or open position to an activated, closed position. In the activated position, a portion of the cable lacing tape 14 that extends from the head assembly 12 is looped back through and retained in the head assembly 12 as it is lodged between the first end 56 of the retainer 18 and the upper and lower walls 50, 52 of the passageway 38. Moreover, the non-symmetric geometry of the second end 58 of the retainer 18 at, for example, the geometry 100 increases friction on the cable lacing tape 14 and thus further discourages rotational movement. In addition, the multifaceted geometry 100 of the second end 58 of the retainer 18 may assist in the prevention of rotation of retainer after locking in place. For instance, the retainer 18 may be designed to be equally effective at preventing rotation of retainer after locking in place with protrusion facing either forward or rearwards, as illustrated in FIGS. 7, 8, and 9, which show the retainer 18 in different rotational location in the activated position, but which each effectively lock the cable lacing tape 14 within the head assembly 12. In any instance, the retainer 18 may include one or more contact points between the retainer 18 and the head assembly 12 to frictionally maintain the tape 14 between the retainer 18 and the lower walls 50, 52 of the passageway 38.

One having ordinary skill in the art will appreciate that there are many ways to advance the retainer 18 from the inactivated to the activated position so as to ensure the desired translation and rotation. In one example, the inner surfaces of the passageway 38 contain channels, and the outer surfaces of the retainer 18 contain pins that fit into the channels. In another example, the friction between the cable lacing tape 14 and the retainer 18 is sufficient so as to rotate the retainer 18 until the second end 58 of the retainer 18 faces generally outwards towards the second opening 42, and to translate the retainer 18 until the retainer 18 lodges between the upper and lower walls 50, 52 of the passageway 38 without utilizing any additional guidance system.

As noted above, in the illustrated examples, the first portion 22 of the cable lacing tape 14 is configured to be retained in a first position within the head assembly 12 by self-adherence of the tape after insertion though an opening in the head assembly 12. However, one having ordinary skill in the art will appreciate that there are many other ways to retain the first portion 22 within the head assembly 12, including, for example, by integrally forming the first portion of the cable lacing tape within the retainer, or by compressing both the first portion 22 and the second portion 24 of the cable lacing tape 14 between the retainer 18 and the body 16, etc. Still further, it will be appreciated that in the activated position illustrated in FIGS. 6-8, in addition to the retainer 18 being capable of frictionally retaining the second portion 24 of the cable lacing tape 14 between the retainer 18 and the head assembly 12, in this example, the activated position will also press the second portion 24 of the lacing tape 14 against the first portion 22 of the lacing tape 14 and against the wall 52, thereby further assisting in locking each end 22, 24 of the lacing tape 14 within the head assembly 12.

When in an installed, activated position, the end 28 of the cable lacing tape 14 may be tucked underneath the cable lacing tape 14 that extends around the objects being held together or bundled. Alternatively, to reduce bulk and unnecessary weight, the cable lacing tape 14 may be trimmed at the first opening 40 or one may leave a portion extending a short distance from the first opening 40 of the head assembly 12. Due to its braided filament structure, the reduced rigidity and relatively dull end of a trimmed cable lacing tape 14 help reduce potential abrasion among adjacent wires, wiring harnesses, cables, or other objects, such as within bundling systems that are subject to movement or service activities. It will be appreciated by one of ordinary skill in the art that a suitable binding agent, such as an adhesive or glue may be used to join and/or treat the cut end.

Having the retainer 18 held in the inactivated position, spaced from the upper and lower walls 50, 52 of the passageway 38, reduces the need for a firm tip (not shown) on the end 28, because the end 28 may easily be threaded through the head assembly 12 and around the retainer 18. Indeed, once in the activated position, the frictional engagement of the first end 56 of the retainer 18 within the passageway 38 is adapted to be self-tightening, and the threading around the retainer 18 will cause the retainer 18 to urge the cable lacing tape 14 into a further compressed and therefore more securely retained position if the plurality of objects pulls on the cable lacing tape 14. Moreover, the non-symmetric geometry of the second end 58 of the retainer 18 at the geometry 100 increases friction on the cable lacing tape 14 and thus further discourages movement.

Referring to FIGS. 7 and 8, there are illustrated different views of the example retainer 18 in the activated position within the example head assembly 12. In these figures, it will be understood that the retainer 18 may rotate more or less as it translates towards the walls 50, 52, and thus the retainer 18 may end up in a different rotational locations while still being sufficiently situated to retain the cable lacing tape 14 within the head assembly 12. For instance, in FIG. 7, the retainer 18 rotates such that the second end 58 with the retaining geometry 100 is located proximate the wall 50. Still further, in FIG. 8, the retainer 18 is rotated such that the second end 58 is located proximate the wall 52.

One having ordinary skill in the art will further appreciate that the cable lacing tape 14 may also include segments (not shown) at preselected positions along the length of the cable lacing tape 14 to facilitate integrity of the tape if cut. Such positions may be provided to permit removal of unnecessary or undesirable extra length of an installed cable lacing tape 14. The segments (not shown) may be molded to the cable lacing tape 14, or may be formed with other binding agents. The cable lacing tape 14 may be cut at any point along the portion of the cable lacing tape 14 that extends from the head assembly 12 that is more distal to at least a portion of such a segment (not shown). Thus, the cable lacing tape 14 may be cut at a point along its length that is located beyond a segment (not shown), so as to leave a soft end of the cable lacing tape 14 but with the assurance that it cannot degrade beyond the nearest segment (not shown). It will be appreciated that such a cable lacing tape having segments may be used in any of the examples in this disclosure, and that the cable lacing tape 14 also would be of woven or braided construction.

It will also be appreciated by one having ordinary skill in the art that the first portion of the cable lacing tape alternatively may not be retained initially within the head assembly, but only after being passed through a passageway in the head assembly and after a retainer has been manipulated or moved into an activated position. Also, with respect to any of the example embodiments herein that have a first portion of a cable lacing tape retained in a head assembly in a fixed manner prior to passing a second portion of the cable lacing tape through the head assembly, it will be understood that such devices may be configured to have the second portion of the cable lacing tape extend from the head assembly from the same surface through which the second portion will be routed to pass through the head assembly, or may extend from other than the surface through which the second portion will be routed to pass through the head assembly.

It will further be appreciated by one having ordinary skill in the art that various modifications may be made to the structures described or required within a cable lacing tie device, while still falling within the spirit and scope of the claimed subject matter. For example, when the cable lacing tie device is installed, the first portion of the cable lacing tape that is retained within the head assembly may extend in a first general direction and the second portion of the cable lacing tape may be retained within the head assembly and extend in a second general direction, wherein the first and second general directions are substantially parallel or substantially perpendicular.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A head assembly for retaining a cable lacing tape, the head assembly comprising:

a first portion comprising a first wall defining a surface of a first passageway for operatively coupling and retaining a first end of the cable lacing tape;

a second portion for frictionally retaining a second end of the cable lacing tape, the second portion comprising:

a second wall defining a surface of a second passageway extending from a first side of the head assembly around a movable retainer transversely received within the second passageway and exiting through the same first side of the head assembly, wherein the retainer is movable between an inactivated position where the second end of the cable lacing tape is freely movable within the second passageway to an activated position where the cable lacing tape is immobilized and frictionally retained against the retained first end of the cable lacing tape and the first and second walls by the retainer, wherein the retainer is integrally formed with the head assembly, and wherein movement of the retainer from the inactivated position to the activated position causes a separation of the retainer from the head assembly.

2. The head assembly as defined in claim 1, wherein the retainer is movable from the inactivated position towards the activated position by pulling the second end of the cable lacing tape.

3. The head assembly as defined in claim 1, wherein the retainer both translates and rotates when moving from the inactivated position towards the activated position.

4. The head assembly as defined in claim 1, wherein the retainer includes a first end having smooth, rounded geometry and a second end comprising an angular geometry.

5. The head assembly as defined in claim 4, wherein the angular geometry includes at least one of a protrusion or point.

6. The head assembly as defined in claim 5, wherein the second portion of the cable lacing tape is frictionally engaged with the protrusion or point of the retainer when the retainer is moved to the activated position.

7. A cable lacing tape assembly, comprising:
a cable lacing tape; and
a head assembly, wherein the head assembly comprises:
- a first portion comprising a first wall defining a surface of a first passageway that is operatively coupled to and which retains a first end of the cable lacing tape;
- a second portion that frictionally retains a second end of the cable lacing tape, the second portion comprising:
    - a second wall defining a surface of a second passageway extending from a first side of the head assembly around a movable retainer transversely received within the second passageway and exiting through the same first side of the head assembly,
    - wherein the retainer is caused to be moved by a movement of the cable lacing tape between an inactivated position where the second end of the cable lacing tape is freely movable within the second passageway to an activated position where the cable lacing tape is immobilized and frictionally retained against the retained first end of the cable lacing tape and the first and second walls by the retainer.

8. The cable lacing tape assembly as defined in claim 7, wherein the retainer is moved from the inactivated position towards the activated position by pulling the second end of the cable lacing tape.

9. The cable lacing tape assembly as defined in claim 7, wherein the retainer both translates and rotates when moved from the inactivated position towards the activated position.

10. The cable lacing assembly as defined in claim 7, wherein the retainer includes a first end having smooth, rounded geometry and a second end comprising an angular geometry.

11. The cable lacing assembly as defined in claim 10, wherein the angular geometry includes at least one of a protrusion or point.

12. The cable lacing assembly as defined in claim 11, wherein the second portion of the cable lacing tape is frictionally engaged with the protrusion or point of the retainer when the retainer is moved to the activated position.

13. The cable lacing assembly as defined in claim 7, wherein the retainer is integrally formed with the head assembly, and wherein movement of the retainer from the inactivated position to the activated position causes a separation of the retainer from the head assembly.

* * * * *